March 24, 1936.  A. H. MILLS  2,035,333
CHURN
Filed March 14, 1935
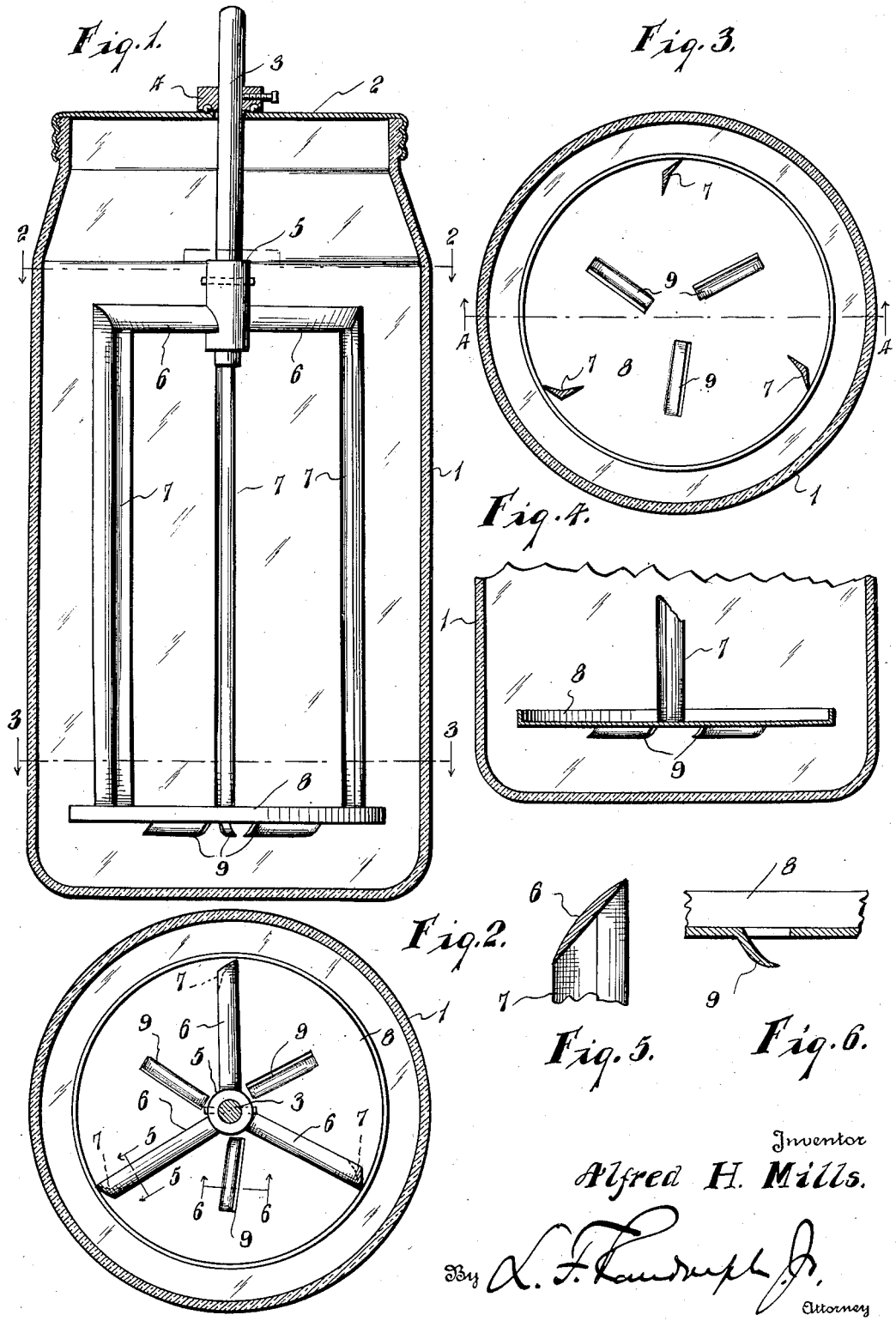
Inventor
Alfred H. Mills.
By
Attorney

UNITED STATES PATENT OFFICE 2,035,333

CHURN

Alfred H. Mills, Balmorhea, Tex.

Application March 14, 1935, Serial No. 11,126

1 Claim. (Cl. 259—134)

This invention has reference to churns, and has for an object the provision of an extremely simple, cheap and efficient construction of dashers that will break the globules of the cream and churn butter in any easy and expeditious manner.

Another object is the provision of a churn dasher which will bodily remove the butter when the dasher is withdrawn from the churn body after the churning operation.

Other objects and advantages will appear in the following description which is to be read in connection with the drawing accompanying and forming part of this specification.

In the drawing:

Figure 1 is an approximately central vertical transverse section through a churn in accordance with this invention;

Figure 2 is a transverse section on the line 2—2 of Figure 1;

Figure 3 is a similar section on the line 3—3 of Figure 1;

Figure 4 is a detail section on the line 4—4 of Figure 3, and

Figures 5 and 6 are detail sectional views on the respective lines 5—5 and 6—6 of Figure 2.

The improvement is primarily directed to small household churns but, of course, may be employed for commercial use. The churn dasher may be rotated or reciprocated either by hand or power driven means.

In the drawing the churn body 1 is shown as a glass jar, such as is ordinarily utilized as a container for canned or preserved fruits or vegetables. The wide open mouth of the body 1 has screwed thereon a cap 2. Passed centrally through a bearing opening in the cap is a shaft 3 rotated by either hand or power means.

On the shaft 3 there is preferably secured an adjustable collar 4 that may carry anti-frictional balls which travel in a race-way on the outer face of the cap 2.

The shaft 3 has its inner end adjustably secured in a sleeve 5, on the upper or outer end of the dasher of the improvement. Fixed on the sleeve, and radiating therefrom, are blades 6, disposed at downward and inward angles with respect to the axial center of the dasher. To the outer end of each of these blades 6 there is secured a plate 7. The plates 7 provide vanes and have their bodies disposed at angles from their connection with the blades 6, so that the said vanes will direct cream toward the center of the dasher. The vanes have knife edges.

The vanes 7 have secured to their free ends a flanged disk or pan 8. The bottom of the pan 8 is radially slitted both longitudinally and transversely, at points between the vanes 7, and the metal bounded by these slits is rounded downwardly and outwardly to provide curved scoops 9.

The pan 8 is disposed at a desired distance above the bottom of the body 1. The dasher parts are preferably of aluminum. Cream is inserted in the mouth of the body 1. Motion is imparted to the dasher. The blades 6 direct the cream into the dasher in a downward path. The vanes 7 direct the cream into and toward the axial center of the dasher. The scoops 9 pick up the cream from the bottom of the churn and dash the same into the body. The contact of the parts of the dasher with the cream is quick and violent so that the globules of the cream will be quickly broken to produce butter in an expeditious manner. This butter is held in the dasher and the milk therefrom is drained from the butter into the body of the churn. The dasher, when withdrawn from the body 1, after the churning operation, will carry therewith all of the butter.

The construction, operation and advantages of the improvement are believed apparent and that further description is not necessary. Obviously the improvement is not to be restricted to the device as illustrated and described and therefore such departures therefrom may be made as fall within the scope of the appended claim.

What is claimed is:—

A churn dasher, comprising a substantially vertical shaft, blades radiating from said shaft and having their front faces inclined downwardly and rearwardly relatively to the rotation of the shaft, a substantially vertical vane extending downwardly from each blade and having its front face inclined inwardly and rearwardly of the rotation of the shaft, a plate secured to the lower ends of said vanes and having elongated radial openings therein, an upstanding peripheral flange on said plate, and curved scoops on the under side of said plate at the rear of said openings relatively to rotation of the shaft, said blades, vanes and scoops providing means to force material into the median portion of said dasher.

ALFRED H. MILLS.